(12) United States Patent
Anbananthan

(10) Patent No.: US 8,842,973 B2
(45) Date of Patent: Sep. 23, 2014

(54) PROVIDING SERVICES USING DATA ON BLU-RAY DISC

(75) Inventor: Saravana Prabhu Anbananthan, Los Angeles, CA (US)

(73) Assignees: Sony Corporation, Tokyo (JP); Sony Pictures Technologies Inc., Culver City, CA (US)

( * ) Notice: Subject to any disclaimer, the term of this patent is extended or adjusted under 35 U.S.C. 154(b) by 0 days.

(21) Appl. No.: 12/896,207

(22) Filed: Oct. 1, 2010

(65) Prior Publication Data

US 2011/0083143 A1 Apr. 7, 2011

Related U.S. Application Data

(60) Provisional application No. 61/248,276, filed on Oct. 2, 2009.

(51) Int. Cl.
*H04N 5/761* (2006.01)

(52) U.S. Cl.
USPC ............................................ 386/282; 386/239

(58) Field of Classification Search
None
See application file for complete search history.

(56) References Cited

U.S. PATENT DOCUMENTS

| | | |
|---|---|---|
| 2001/0028366 A1 | 10/2001 | Ohki et al. |
| 2008/0196070 A1 | 8/2008 | White et al. |
| 2008/0250465 A1* | 10/2008 | Kim et al. .................. 725/87 |
| 2008/0260255 A1 | 10/2008 | Fukushima et al. |
| 2008/0260355 A1 | 10/2008 | Baek et al. |
| 2008/0307108 A1* | 12/2008 | Yan et al. .................. 709/231 |
| 2009/0049473 A1* | 2/2009 | Pickelsimer et al. ........... 725/40 |
| 2009/0097696 A1* | 4/2009 | Knoll et al. .................. 382/100 |
| 2009/0217057 A1 | 8/2009 | Konetski |
| 2009/0276462 A1 | 11/2009 | Inokuchi |
| 2009/0288076 A1 | 11/2009 | Johnson et al. |
| 2009/0307201 A1 | 12/2009 | Dunning et al. |
| 2009/0313661 A1* | 12/2009 | Liu et al. .................. 725/87 |
| 2012/0063745 A1* | 3/2012 | Baek et al. .................. 386/262 |

FOREIGN PATENT DOCUMENTS

| | | |
|---|---|---|
| CN | 101026615 A | 8/2007 |
| CN | 101278271 A | 10/2008 |

OTHER PUBLICATIONS

LG Electronics, "LG Electronics Announces New Streaming Content Partners for Its Network Blu-ray Disc Players," EMediaLive, Dec. 30, 2008, 3 pages.
Korean Office Action issued in copending application No. KR 10-2012-7003759 ( 3 pages).

* cited by examiner

*Primary Examiner* — William C Vaughn, Jr.
*Assistant Examiner* — Eileen Adams
(74) *Attorney, Agent, or Firm* — Procopio, Cory, Hargreaves & Savitch, LLP

(57) ABSTRACT

Providing a VOD service using BD data available to a BD player includes: preparing VOD data such that the BD player can use the VOD data to provide the VOD service; inserting the VOD data onto a BD; preparing VOD selections and VOD metadata based on the VOD data read from the BD; and delivering the content item selected by a user from a menu of VOD selections. Keywords include Blu-ray, BD-Live, Video-on-Demand.

18 Claims, 4 Drawing Sheets though various implementations of the present invention will be described herein, it is understood that these implementations are presented by way of example only, and not limitation. As such, this detailed description of various implementations should not be construed to limit the scope or breadth of the present invention.

PROVIDING SERVICES USING DATA ON BLU-RAY DISC

CROSS-REFERENCE TO RELATED APPLICATIONS

This application claims the benefit of priority under 35 U.S.C. §119(e) of U.S. Provisional Patent Application No. 61/248,276, filed Oct. 2, 2009, entitled "Video On Demand in Blu-ray." The disclosure of the above-referenced application is incorporated herein by reference.

BACKGROUND

1. Field of the Invention

The present invention relates to a Blu-ray disc (BD), and more specifically, to providing services using data on the BD available to a BD player.

2. Background

Blu-ray disc (BD) is an optical disc format that provides a storage capacity required for storing an entire feature movie in high definition (HD) quality. The format supports storing additional data including metadata which provides information about the content stored on the BD as well as other information such as an identity of the user. The format also supports using data from local storage devices of the BD player such as a hard disc or flash memory.

SUMMARY

In one implementation, a method of providing a VOD service using BD data available to a BD player is disclosed. The method includes: preparing VOD data such that the BD player can use the VOD data to provide the VOD service; inserting the VOD data onto a BD; preparing VOD selections and VOD metadata based on the VOD data read from the BD; and delivering the content item selected by a user from a menu of VOD selections.

In another implementation, a method of providing a BD service using VOD data available to a BD player is disclosed. The method includes: reading the VOD data present on a BD loaded into a BD player; preparing and presenting a menu of VOD selections using the VOD data to a user; receiving a content item selection selected by the user; and requesting a delivery of the selected content item.

In a further implementation, a non-transitory tangible storage medium storing a computer program for providing a VOD service using BD data available to a BD player is disclosed. The computer program includes executable instructions that cause a computer to: prepare VOD data such that the BD player can use the VOD data to provide the VOD service; insert the VOD data onto a BD; prepare VOD selections and VOD metadata based on the VOD data read from the BD; and deliver the content item selected by a user from a menu of VOD selections.

Other features and advantages of the present invention will become more readily apparent to those of ordinary skill in the art after reviewing the following detailed description and accompanying drawings.

DETAILED DESCRIPTION

Figure 1:
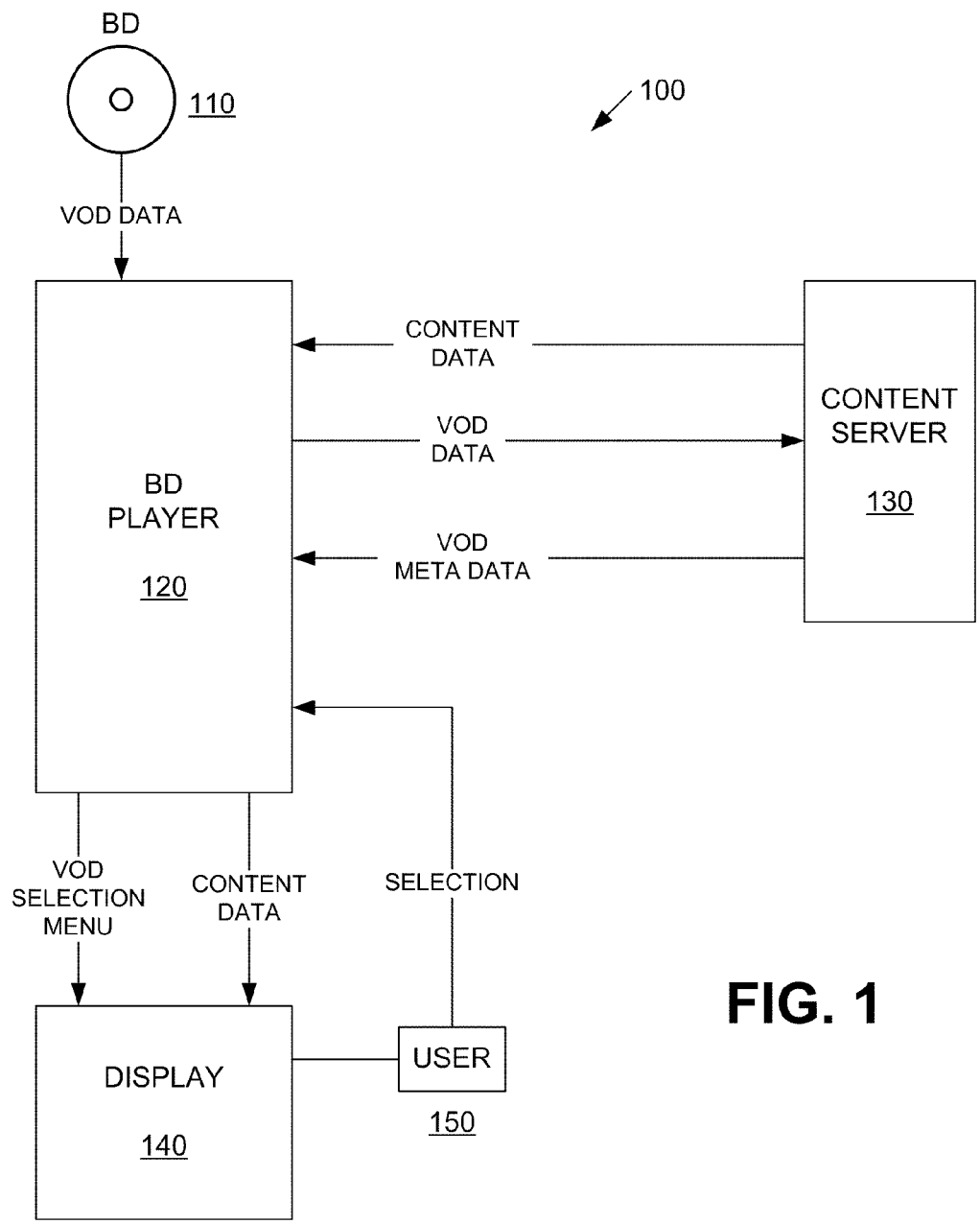
FIG. 1 shows a system for providing VOD using BD in accordance with one implementation of the present invention.

Certain implementations as disclosed herein include providing a video on demand (VOD) service using a Blu-ray disc (BD). After reading this description it will become apparent how to implement the invention in various implementations and applications. However, although various implementations of the present invention will be described herein, it is understood that these implementations are presented by way of example only, and not limitation. As such, this detailed description of various implementations should not be construed to limit the scope or breadth of the present invention.

Various implementations include techniques for providing a VOD service using a BD. In one implementation, the techniques provide movie studios to directly advertise and market their movies. In another implementation, the techniques are used by other entities to advertise and distribute their media. In yet another implementation, the techniques involve using a server which provides an interface for BD players to access and use content available on a network resource (e.g., a server). A content service referred to as BD-Live provides additional information related to a movie stored on a BD inserted into the player, such as actor information or additional images.

In one implementation, a BD includes data that a BD player can use to provide a VOD service. For example, when a BD is loaded into a BD player, and the player has read the VOD data from the BD, the BD player can present a menu of VOD selections though a display. The VOD data from the BD could include indications of what selections to present. When a content item is selected from the menu, the BD player accesses a content server (e.g., BD-Live) to download or stream the corresponding content data. The content data can be encrypted and provided under a digital rights management (DRM) system. The content server may provide multiple options for encryption or DRM and match to the appropriate combination for the requesting BD player, the Blu-ray disk, and user account. There may be a financial transaction as well before the content is delivered (e.g., a credit card payment), also through the content server, though it may involve a different network server.

In another implementation, the VOD data includes data about the BD that the BD player and the content server can use to determine some or all of the selections to present. In one case, the received VOD data (received from the BD) could be sent to the content server which would use that data to select available items to display. Similarly, the BD player and/or content server can also use additional information in the VOD data to further refine the selection. For example, the BD player may have stored information (e.g., on a hard disk of the BD player) indicating other movies recently viewed or other recent VOD selections. The content server may have the same or additional profile information.

In another implementation, the VOD data includes promotional or financial information as well. For example, when a movie is presented for selection (or when it is selected), the VOD data may indicate that the price to stream the movie is one price, and the price to download is another price. Alternatively, the VOD data could indicate particular discounts to apply, rather than specific prices. Further, the VOD data could include time information controlling when the price or discounts are valid. Similarly, the VOD data could include multiple prices and/or discounts with multiple time windows or periods and the correct one is selected based on current time. In one case, the content server provides the pricing information (using VOD metadata) based on data at the server in conjunction with VOD data from the BD player. In one example, the content server may provide a discount if the content is streamed on days with lower network traffic to reduce network expenses for the content server provider. In another example, the VOD metadata from the content server could include indications of what selections to present based on the data available at the content server including the VOD data from the BD.

In one example of a discount, a new movie can be streamed at a discount (or for free) for a user that has a BD for a different movie. This discount could be useful for promoting a sequel. For example, when the sequel is made available for streaming or download, a user that already has a BD for the earlier movie can insert that BD and access the new movie through the VOD interface. Thus, purchasing a single BD in a series of content (movie or television) could act as a key to unlocking discounts on streaming or downloading other items in the series. Similarly, by maintaining a record of discs, the BD player could use that information to provide an increased discount if the user has multiple discs in the series. Alternatively, the discount and promotion can be applied across a related collection of titles, rather than a series.

In one implementation, the items presented for selection include items that the BD player recognizes as items which are associated with the user of the BD player. The user identity could be established through a login process. The available items could include items stored on a local network or on a network server.

FIG. 1 shows a system 100 for providing VOD using BD in accordance with one implementation of the present invention. The system 100 includes a BD 110, a BD player 120, a content server 130, and a display 140.

In the illustrated implementation of FIG. 1, the BD 110 includes data that the BD player 120 can use to provide a VOD service. For example, when the BD 110 is loaded into the BD player 120, and the player has read the VOD data from the BD 110, the BD player 120 can present a menu of VOD selections though a display 140. The VOD data from the BD 110 could include indications of what selections to present. When a content item is selected from the menu by a user 150, the BD player 120 accesses the content server 130 to download or stream the corresponding content data. The content data can be encrypted and provided under a digital rights management (DRM) system. The content server 130 may provide multiple options for encryption or DRM and match to the appropriate combination for the requesting BD player 120 and user account.

In the illustrated implementation of FIG. 1, the VOD data includes data about the BD 110 that the BD player 120 and the content server 130 can use to determine some or all of the selections to present. The received VOD data (received from the BD 110) would be sent to the content server 130 which would use that data to select available items to display. Similarly, the BD player 120 and/or content server 130 can also use additional information in the VOD data to further refine the selection. The content server 130 can send information in the VOD metadata indicating what selections to present based on the data available at the content server 130 including the VOD data from the BD 110.

Figure 2:
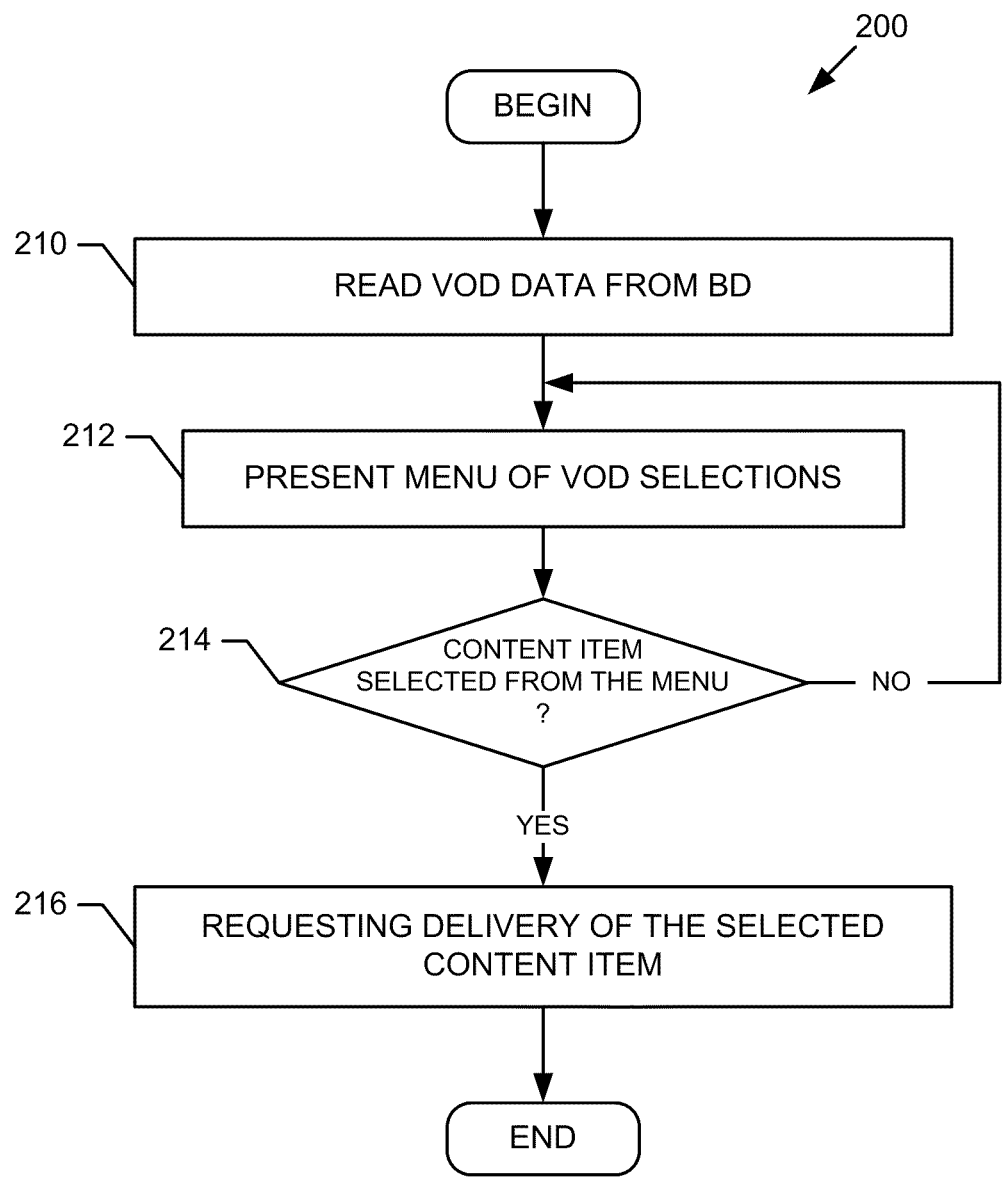
FIG. 2 is a flowchart illustrating a process for providing a VOD service using VOD data available to a BD player in accordance with one implementation of the present invention.

FIG. 2 is a flowchart 200 illustrating a process for providing a VOD service using VOD data available to a BD player in accordance with one implementation of the present invention. In one implementation, the VOD service includes receiving a content item selected from a menu of VOD selections. In the illustrated implementation of FIG. 2, VOD data is read, at box 210, from a BD loaded into a BD player. The VOD data can include data about the BD that can be used to determine some or all of the selections to present. For example, if the inserted BD stores a children's movie by a particular movie studio X, the VOD data would indicate the genre as 'children' and studio as 'X'.

A menu of VOD selections is then presented, at box 212. In one case, the VOD data from the BD can include indications of what selections to present in the menu. In another case, the received VOD data can be sent to a content server which would use that data to select available items to display in the menu. The selection by the content server can be included in VOD metadata sent from the content server to the BD player. Similarly, the BD player and/or content server can also use additional information in the VOD data to further refine the selection. For example, the BD player may have stored information indicating other movies recently viewed or other recent VOD selections. The content server may have the same or additional user profile information.

When a content item is selected from the menu, at box 214, the selected content item is delivered to the BD player, at box 216. The selected content item can be downloaded or streamed. Further, the selected content item can be encrypted and provided under a DRM system.

Figure 3:
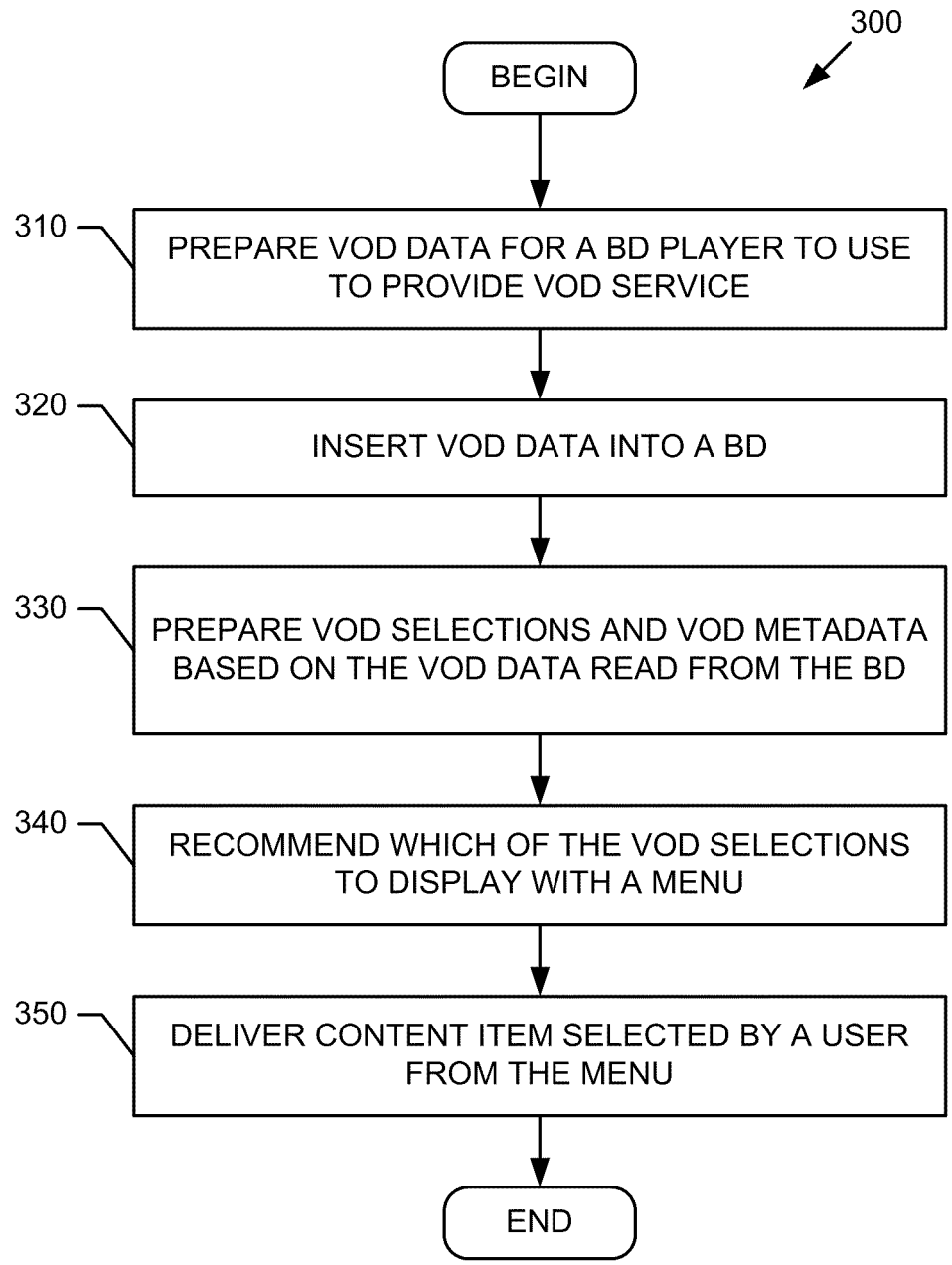
FIG. 3 is a flowchart illustrating a process for providing a VOD service using VOD data available to a BD player in accordance with another implementation of the present invention.

FIG. 3 is a flowchart 300 illustrating a process for providing a VOD service using VOD data available to a BD player in accordance with another implementation of the present invention. In the illustrated implementation of FIG. 3, VOD data is prepared, at box 310, such that a BD player can use it to provide a VOD service. The prepared VOD data is then inserted into a BD, at box 320. In one implementation, the preparation and insertion of the VOD data onto a BD is performed by a content provider which prepares and places the original content onto the BD. The VOD data includes data about the BD that the BD player and the content server can use to determine some or all of the selections to present. In one case, the VOD data extracted from the BD can be sent (e.g., by a BD player) to the content server which would use that data to select available items to display. Thus, VOD selections and VOD metadata are prepared, at box 330, based on the VOD data read from the BD.

In one implementation, the VOD selections and the VOD metadata are prepared by the content server. This VOD metadata includes information such as which of the VOD selections should be displayed by the BD player based on information including the genre of the original content on the BD and the user identity. According, at box 340, a subset of the VOD selections is recommended for display with the menu. The content server can also use additional information in the VOD data to further refine the selection. For example, the content server may have stored information indicating other movies recently viewed or other recent VOD selections for a particular user identified by the user identity. The content item selected by the user from the menu of VOD selections is delivered, at box 350.

Figure 4A:
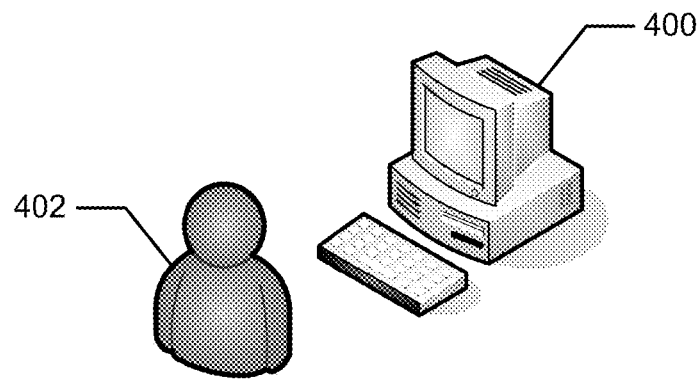
FIG. 4A illustrates a representation of a computer system and a user.

FIG. 4A illustrates a representation of a computer system 400 and a user 402. The user 402 uses the computer system 400 to provide VOD using BD. The computer system 400 stores and executes a VOD in BD system 490.

Figure 4B:
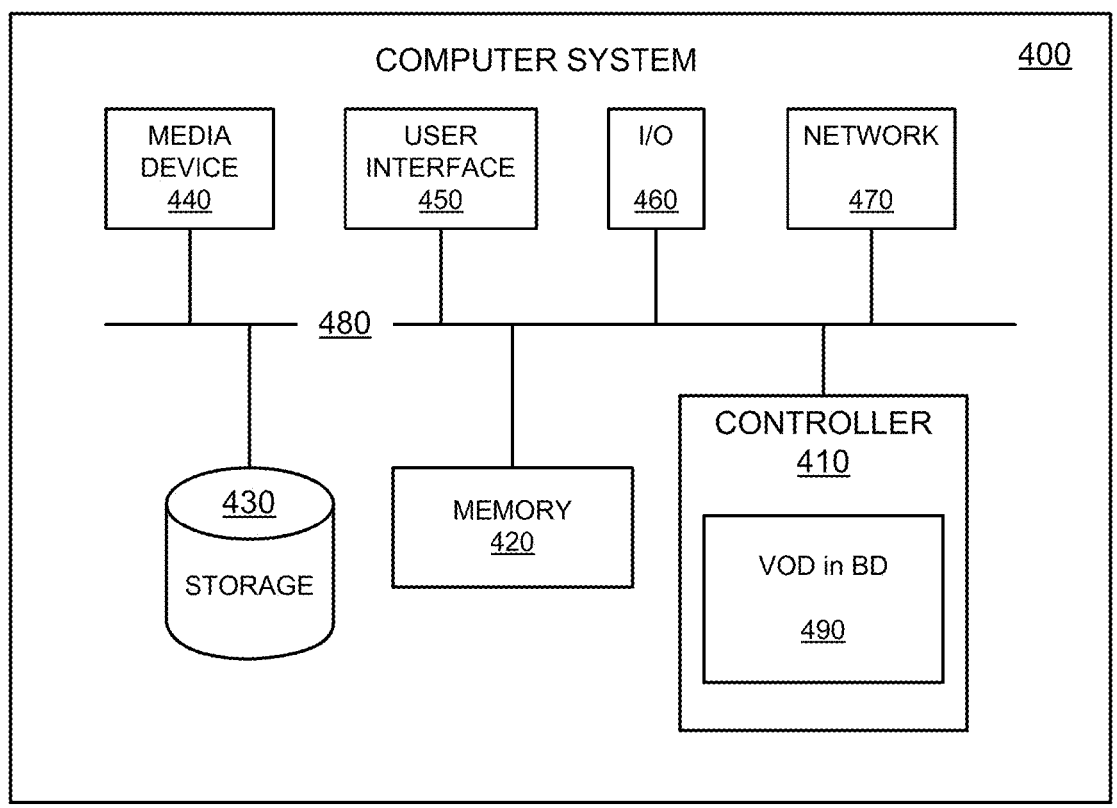
FIG. 4B is a functional block diagram illustrating the computer system hosting the VOD in BD system.

FIG. 4B is a functional block diagram illustrating the computer system 400 hosting the VOD in BD system 490. The controller 410 is a programmable processor and controls the operation of the computer system 400 and its components. The controller 410 loads instructions (e.g., in the form of a computer program) from the memory 420 or an embedded controller memory (not shown) and executes these instructions to control the system. In its execution, the controller 410 provides the VOD in BD system 490 as a software system. Alternatively, this service can be implemented as separate hardware components in the controller 410 or the computer system 400.

Memory 420 stores data temporarily for use by the other components of the computer system 400. In one implementation, memory 420 is implemented as RAM. In one implementation, memory 420 also includes long-term or permanent memory, such as flash memory and/or ROM.

Storage 430 stores data temporarily or long term for use by other components of the computer system 400, such as for storing data used by the VOD in BD 490. In one implementation, storage 430 is a hard disk drive.

The media device 440 receives removable media and reads and/or writes data to the inserted media. In one implementation, for example, the media device 440 is an optical disc drive.

The user interface 450 includes components for accepting user input from the user of the computer system 400 and presenting information to the user. In one implementation, the user interface 450 includes a keyboard, a mouse, audio speakers, and a display. The controller 410 uses input from the user to adjust the operation of the computer system 400.

The I/O interface 460 includes one or more I/O ports to connect to corresponding I/O devices, such as external storage or supplemental devices (e.g., a printer or a PDA). In one implementation, the ports of the I/O interface 460 include ports such as: USB ports, PCMCIA ports, serial ports, and/or parallel ports. In another implementation, the I/O interface 460 includes a wireless interface for communication with external devices wirelessly.

The network interface 470 includes a wired and/or wireless network connection, such as an RJ-45 or "Wi-Fi" interface (including, but not limited to 802.11) supporting an Ethernet connection.

The computer system 400 includes additional hardware and software typical of computer systems (e.g., power, cooling, operating system), though these components are not specifically shown in FIG. 4B for simplicity. In other implementations, different configurations of the computer system can be used (e.g., different bus or storage configurations or a multi-processor configuration).

The above description of the disclosed implementations is provided to enable any person skilled in the art to make or use the invention. Various modifications to these implementations will be readily apparent to those skilled in the art, and the generic principles described herein can be applied to other implementations without departing from the spirit or scope of the invention. Accordingly, additional implementations and variations are also within the scope of the invention. For example, content includes games, audio or images, in addition to or instead of video. In another example, an alternative media format other than BD can be used. In another example, the content selection and fulfillment are performed by different entities and/or servers, or fulfilled through P2P. Further, it is to be understood that the description and drawings presented herein are representative of the subject matter which is broadly contemplated by the present invention. It is further understood that the scope of the present invention fully encompasses other implementations that may become obvious to those skilled in the art and that the scope of the present invention is accordingly limited by nothing other than the appended claims.

The invention claimed is:

1. A method of providing a video-on-demand (VOD) service using VOD data available on a Blu-ray Disc (BD), the method comprising:
   receiving the VOD data extracted from the BD that was inserted into a BD player,
   wherein the received VOD data is used to obtain the VOD service available from a content server;
   preparing a menu of VOD selections and VOD metadata to be sent to the BD player based on the received VOD data,
   wherein the VOD data includes data about the BD that the BD player and the content server use to determine the VOD selections to present,
   wherein the VOD metadata comprises metadata indicating which of the VOD selections to be made from the menu should be displayed by the BD player based on a genre of original content stored on the BD and an identity of a user; and
   delivering content items selected by the user from the menu of the VOD selections.

2. The method of claim 1, further comprising recommending a subset of the VOD selections for display on the menu.

3. The method of claim 1, wherein the content items selected by the user from the menu of VOD selections are delivered to the BD player.

4. The method of claim 1, wherein the content items selected by the user from the menu of VOD selections are delivered to a device other than the BD player.

5. The method of claim 4, wherein the device other than the BD player comprises a gaming device.

6. The method of claim 1, wherein preparing the menu of VOD selections and VOD metadata is also based on other stored information including at least one of: (1) information indicating other movies recently viewed by the user; and (2) other recent content items selected by the user from the menu of VOD selections.

7. The method of claim 6, wherein the other stored information comprises additional profile information of the user.

8. A method of receiving a VOD service using VOD data available on a BD, the method comprising:
   loading the BD into a BD player to enable the BD player to read the VOD data present on the BD,
   wherein the BD player uses the VOD data on the BD to obtain the VOD service available from a content server;
   making a content item selection from a menu of VOD selections presented by the BD player,
   wherein the menu of VOD selections is prepared using the VOD data and VOD metadata sent from the content server,
   wherein the VOD data includes data about the BD that the BD player and the content server use to determine the VOD selections to present,
   wherein the VOD metadata comprises metadata indicating which of the VOD selections to be made from the menu should be displayed by the BD player based on a genre of original content stored on the BD and an identity of a user; and
   receiving the selected content item from the content server.

9. The method of claim 8, wherein the content items selected by the user from the menu of VOD selections are received by the BD player.

10. The method of claim 8, wherein the content items selected by the user from the menu of VOD selections are received by a device other than the BD player.

11. The method of claim 10, wherein the device other than the BD player comprises a gaming device.

12. A non-transitory tangible storage medium storing a computer program for providing a VOD service using VOD data available on a BD, the computer program comprising executable instructions that cause a computer to:
   receive the VOD data extracted from the BD, that was inserted into a BD player,
   wherein the received VOD data is used to obtain the VOD service available from a content server;
   prepare a menu of VOD selections and VOD metadata to be sent to the BD player based on the received VOD data,
   wherein the VOD data includes data about the BD that the BD player and the content server use to determine the VOD selections to present,
   wherein the VOD metadata comprises metadata indicating which of the VOD selections to be made from the menu should be displayed by the BD player based on a genre of original content stored on the BD and an identity of a user; and
   deliver content items selected by the user from the menu of the VOD selections.

13. The non-transitory tangible storage medium of claim 12, further comprising executable instructions that cause a computer to
   recommend a subset of the VOD selections for display on the menu.

14. The non-transitory tangible storage medium of claim 12, wherein the content items selected by the user from the menu of VOD selections are delivered to the BD player.

15. The non-transitory tangible storage medium of claim 12, wherein the content items selected by the user from the menu of VOD selections are delivered to a device other than the BD player.

16. The non-transitory tangible storage medium of claim 12, wherein preparing the menu of VOD selections and VOD metadata is also based on other stored information including at least one of: (1) information indicating other movies recently viewed by the user; and (2) other recent content items selected by the user from the menu of VOD selections.

17. The non-transitory tangible storage medium of claim 16, wherein the other stored information comprises additional profile information of the user.

18. A non-transitory tangible storage medium storing a computer program for receiving a VOD service using VOD data available on a BD, the computer program comprising executable instructions that cause a computer to:
   reading the VOD data from the BD that was inserted into a BD player;
   sending the VOD data read from the BD to a content server to obtain the VOD service from the content server;
   receiving a menu of VOD selections and VOD metadata prepared based on the VOD data,
   wherein the VOD metadata comprises metadata indicating which of the VOD selections to be made from the menu should be displayed by the BD player based on a genre of original content stored on the BD and an identity of a user;
   selecting and sending a VOD selection made from the menu to the content server;
   receiving content items selected by the user.

* * * * *